(12) United States Patent
Kim et al.

(10) Patent No.: US 11,504,950 B2
(45) Date of Patent: Nov. 22, 2022

(54) FILM FOR GLASS LAMINATION, METHOD FOR MANUFACTURING SAME, LAMINATED GLASS COMPRISING SAME, AND TRANSPORTATION MEANS COMPRISING SAME

(71) Applicant: SKC Co., Ltd., Suwon-si (KR)

(72) Inventors: Hyejin Kim, Suwon-si (KR); Kyuhun Kim, Suwon-si (KR)

(73) Assignee: SKC Co., Ltd., Suwon-Si (KR)

( * ) Notice: Subject to any disclaimer, the term of this patent is extended or adjusted under 35 U.S.C. 154(b) by 0 days.

(21) Appl. No.: 17/363,396

(22) Filed: Jun. 30, 2021

(65) Prior Publication Data

US 2021/0323277 A1 Oct. 21, 2021

Related U.S. Application Data

(63) Continuation of application No. PCT/KR2019/009134, filed on Jul. 24, 2019.

(30) Foreign Application Priority Data

Dec. 31, 2018 (KR) .......................... 10-2018-0173705

(51) Int. Cl.
*B32B 17/10* (2006.01)
*B32B 7/023* (2019.01)
*B60J 3/00* (2006.01)

(52) U.S. Cl.
CPC .......... *B32B 17/1066* (2013.01); *B32B 7/023* (2019.01); *B32B 17/10* (2013.01);
(Continued)

(58) Field of Classification Search
CPC ................ B32B 17/1066; B32B 7/023; B32B 17/10036; B32B 17/10761; B32B 17/10357; B60J 3/007
(Continued)

(56) References Cited

U.S. PATENT DOCUMENTS

| 6,264,731 B1 * | 7/2001 | Gundlach | ............... | C09D 11/30 |
| | | | | 106/31.86 |
| 6,582,807 B2 * | 6/2003 | Baer | ...................... | B29C 48/71 |
| | | | | 156/244.11 |

(Continued)

FOREIGN PATENT DOCUMENTS

| CN | 103786391 A | 5/2014 |
| CN | 105722802 A | 6/2016 |

(Continued)

*Primary Examiner* — Tahseen Khan
(74) *Attorney, Agent, or Firm* — NSIP Law

(57) ABSTRACT

A glass lamination film includes a tinted zone in which one or more colored layers are disposed and a clear zone. The tinted zone includes a colored zone with a fixed color and a color change zone disposed between the colored zone and the clear zone, and a color of the color change zone has a varying density. A fade off zone has relative transmittance (Rt, %) of 30 to 80%. The color change zone includes the fade off zone having a distance of 15 to 25 mm. The colored layer includes a first colored layer and a second colored layer disposed below the first colored layer. An amount of plasticizer in the second colored layer is larger than an amount of the plasticizer in the first colored layer.

7 Claims, 4 Drawing Sheets

(52) U.S. Cl.
CPC .. *B32B 17/10036* (2013.01); *B32B 17/10357* (2013.01); *B32B 17/10761* (2013.01); *B60J 3/007* (2013.01); *B32B 2605/006* (2013.01)

(58) Field of Classification Search
USPC ........................................................ 428/212
See application file for complete search history.

(56) References Cited

U.S. PATENT DOCUMENTS

| | | | |
|---|---|---|---|
| 2005/0136243 A1* | 6/2005 | Fisher | B32B 17/10495 523/210 |
| 2006/0205871 A1 | 9/2006 | Papenfuhs et al. | |
| 2007/0128452 A1* | 6/2007 | Fisher | G02F 1/16757 428/437 |
| 2012/0028005 A1* | 2/2012 | Zheng | C23C 14/10 427/164 |
| 2012/0156446 A1* | 6/2012 | Brehm | B42D 25/41 428/212 |
| 2014/0362434 A1* | 12/2014 | Schmitz | B32B 17/10761 427/125 |
| 2016/0288465 A1* | 10/2016 | Nakayama | B32B 17/10688 |
| 2018/0104934 A1* | 4/2018 | Mori | B32B 17/10357 |
| 2018/0117887 A1* | 5/2018 | Nakayama | B32B 5/145 |
| 2018/0326696 A1* | 11/2018 | Muguruma | B29C 48/022 |

FOREIGN PATENT DOCUMENTS

| | | |
|---|---|---|
| CN | 107406313 A | 11/2017 |
| JP | 3153904 B2 | 4/2001 |
| JP | 2006-513285 A | 4/2006 |
| JP | 2007-223883 A | 9/2007 |
| JP | 6355564 B2 | 7/2018 |
| JP | 2018-162209 A | 10/2018 |
| KR | 10-2008-0083149 A | 9/2008 |
| KR | 10-2018-0052593 A | 5/2018 |
| KR | 10-2018-0123975 A | 11/2018 |
| KR | 10-2018-0130492 A | 12/2018 |

* cited by examiner

FILM FOR GLASS LAMINATION, METHOD FOR MANUFACTURING SAME, LAMINATED GLASS COMPRISING SAME, AND TRANSPORTATION MEANS COMPRISING SAME

CROSS-REFERENCE TO RELATED APPLICATIONS

Pursuant to 35 USC 120 and 365(c), this application is a continuation of International Application No. PCT/KR2019/009134 filed on Jul. 24, 2019, and claims the benefit under 35 USC 119(a) of Korean Application No. 10-2018-0173705 filed on Dec. 31, 2018, in the Korean Intellectual Property Office, the entire disclosures of which are incorporated herein by reference for all purposes.

BACKGROUND

1. Field

The present disclosure relates to a film for glass lamination including a colored zone having a natural gradation pattern, a method of manufacturing the same, a laminated glass including the same, and a vehicle including the same.

2. Description of Related Art

In general, laminated glass (e.g., tempered glass and safety glass) consists of a pair of glass panels and a synthetic resin film inserted therebetween. Laminated glass is widely used in road vehicles such as automobiles and buildings due to its enhanced safety because its fragments are not scattered even when the glass is broken. A polyvinyl acetal resin having a high affinity for inorganic materials is often utilized in the film applied to such laminated glass.

Functions of the laminated glass include preventing penetration through laminated glass (penetration resistance) and absorbing energy caused by impact to minimize damage or injury of objects or people inside the transparent walls (impact resistance). In addition, it should have excellent optical properties of clear glass and have robust environmental degradation resistant properties such as moisture and the like (optical properties and moisture resistance). Besides, the laminated glass may include a tinted part for preventing blinding light when applied to a windshield of automobiles and so on, or may be colored overall when applied to a sunroof and the like.

The so-called shade band for protecting a driver from a direct ray of light is provided in an upper part of a windshield. The shade band is a tinted zone colored using a coloring agent such as a dye or a pigment in some of a polyvinyl butyral (PVB) film to block the external light during driving.

Today laminated glass is widely used in automobiles, rail vehicles, aircraft, ships, buildings, etc., to prevent blinding light caused by the external light and protect privacy. So that a laminated glass comprising a shade band in which a border between a clear zone and a tinted zone is as naturally as possible converted to have smooth interfaces like a gradation pattern, with not generating optical distortion is demanded.

Related Art References

Korean Patent Publication No. 2018-0123975
Japanese Patent Registration No. 6355564

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a glass lamination film includes a tinted zone in which one or more colored layers are disposed and a clear zone. The tinted zone includes a colored zone with a fixed color and a color change zone disposed between the colored zone and the clear zone, and a color of the color change zone has a varying density. A fade off zone has relative transmittance (Rt, %) of 30 to 80% indicated by Equation 1

$$Rt = \frac{To}{Tc} \times 100$$

where To is a transmittance in the tinted zone and Tc is the transmittance in the clear zone. The color change zone includes the fade off zone having a distance of 15 to 25 mm. The colored layer includes a first colored layer and a second colored layer disposed below the first colored layer. An amount of plasticizer in the second colored layer may be larger than an amount of the plasticizer in the first colored layer.

An amount of a coloring agent in the second colored layer may be larger than an amount of the coloring agent in the first colored layer.

The colored layer may further include a coloring agent and a trioxane-based compound.

The glass lamination film may further include a function layer disposed between the first colored layer and the second colored layer.

In another general aspect, a glass lamination film includes a tinted zone in which one or more colored layers are disposed, and a clear zone. The tinted zone includes a colored zone with a fixed color and a color change zone disposed between the colored zone and the clear zone, and a color of the color change zone has a varying density. A fade off zone has relative transmittance (Rt, %) of 30 to 80% indicated by Equation 1

$$Rt = \frac{To}{Tc} \times 100$$

where To is a transmittance in the tinted zone and Tc is the transmittance in the clear zone. The color change zone includes the fade off zone having a distance of 15 to 25 mm. A conformity index value of 100 or more indicated by Equation 2

$$Qc = FOD * T\max$$

where Qc refers to the conformity index, FOD is a distance (mm) of the fade off zone, and T max is the transmittance (%) in the colored zone. The colored layer includes a first colored layer and a second colored layer disposed below the first colored layer. An amount of plasticizer in the second colored layer is larger than an amount of the plasticizer in the first colored layer.

In another general aspect, a method of manufacturing a glass lamination film includes a melting operation of preparing a molten resin by melting a resin composition for colored layers and a resin composition for non-colored layers, and an extruding operation of manufacturing the glass lamination film comprising one or more colored layers having a wedge shape by inducing the molten resin to flow into a laminating mean. The glass lamination film includes a tinted zone, in which a colored layer is disposed, and a clear zone. The tinted zone includes a colored zone with a fixed color and a color change zone disposed between the colored zone and the clear zone, and a color of the color change zone has a varying density. A fade off zone has relative transmittance (Rt, %) of 30 to 80% indicated by Equation 1

$$Rt = \frac{To}{Tc} \times 100$$

where To is a transmittance in the tinted zone and Tc is the transmittance in the clear zone. The color change zone includes the fade off zone having a distance of 15 to 25 mm. The colored layer includes a first colored layer and a second colored layer disposed below the first colored layer. An amount of plasticizer in the second colored layer is larger than an amount of the plasticizer in the first colored layer.

A light transmission laminate may include the glass lamination film disposed between a first light transmission layer and a second light transmission layer.

A vehicle may include the light transmission laminate.

Other features and aspects will be apparent from the following detailed description, the drawings, and the claims.

Figure 4:
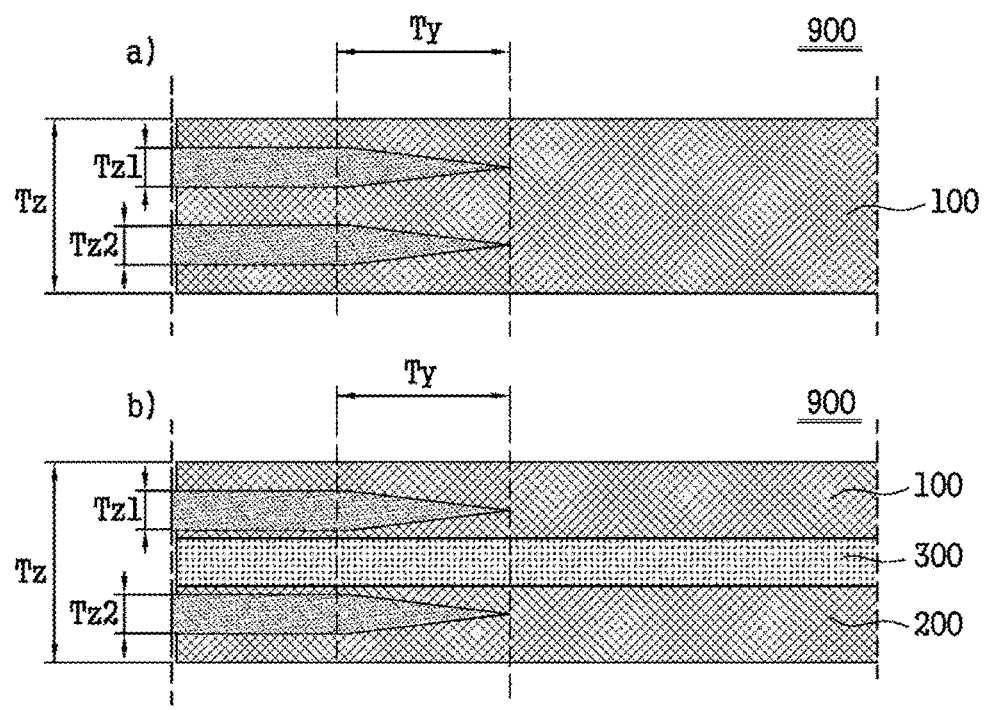

(a) and (b) of FIG. 4 are conceptual views illustrating examples of the thickness of cross-sections of a film for glass lamination.

Figure 5:
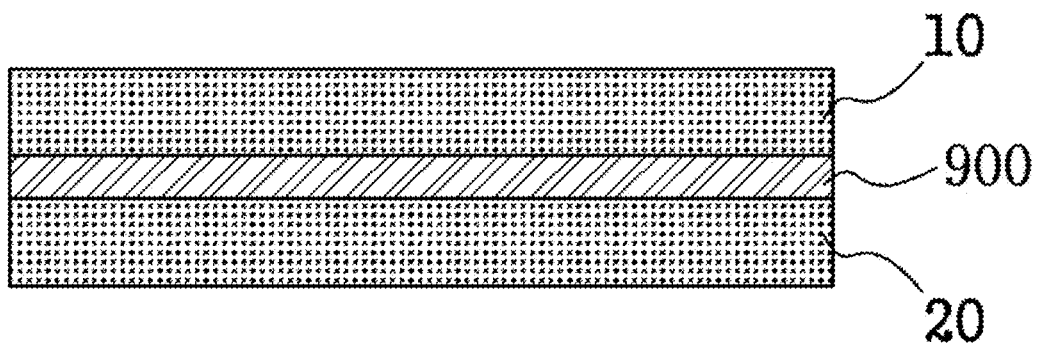

FIG. 5 is a conceptual view illustrating a cross-section of an example of laminated glass.

Figure 6:
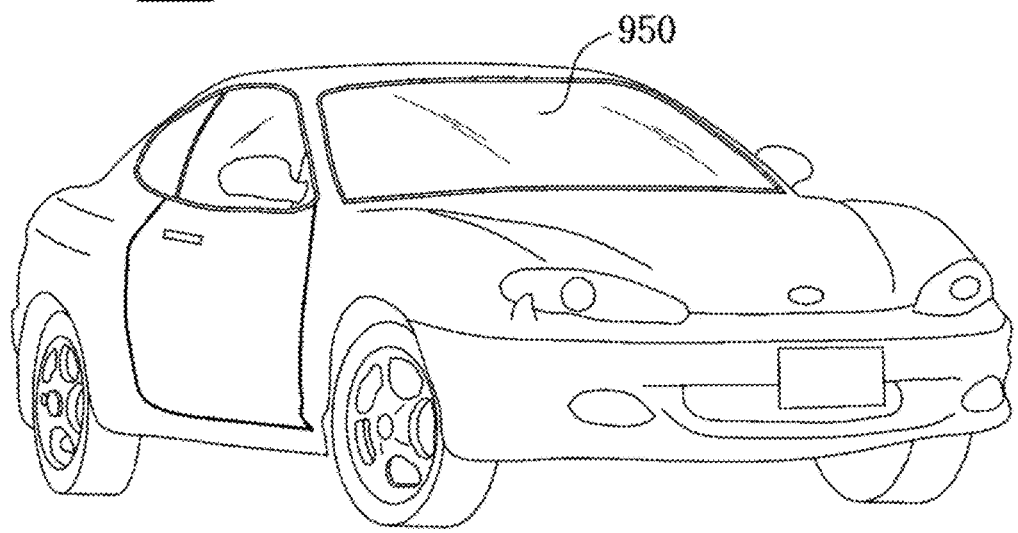

FIG. 6 is a conceptual view illustrating an example of a laminated glass applied to an automobile.

Figure 7:
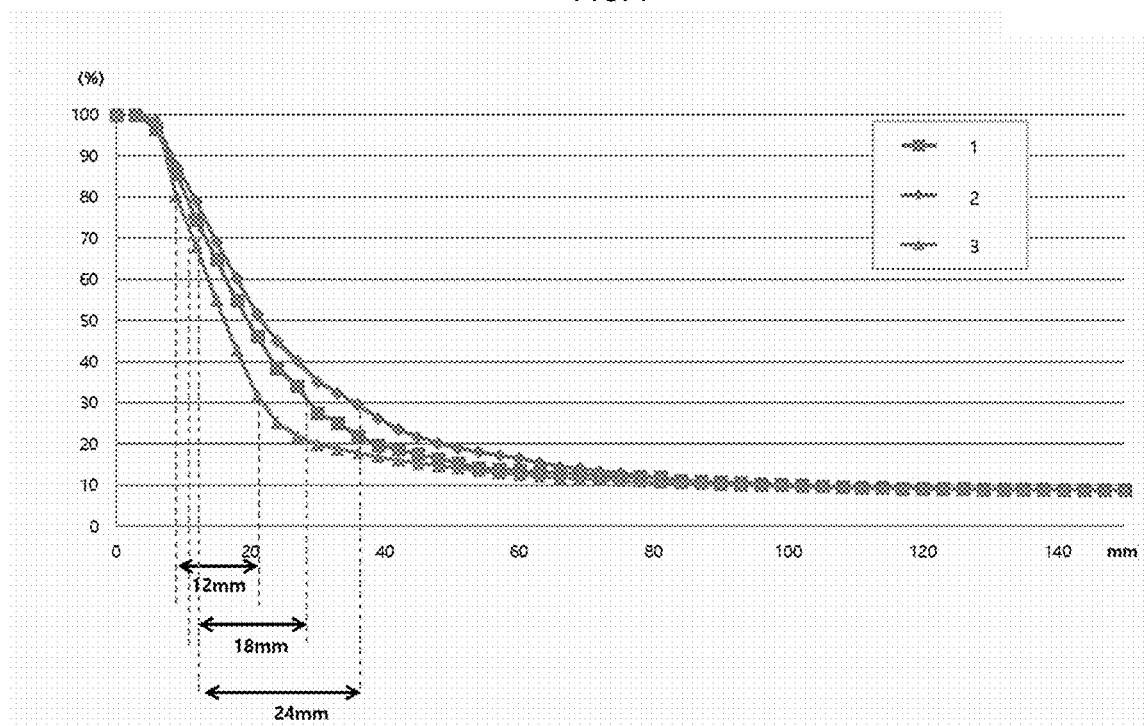

FIG. 7 is a graph showing a result of an example of measuring relative transmittance (Rt) and distance of fade off zone (FOD) of sample films of Examples 1 to 3 of the present disclosure (x-axis: relative position of a measured portion and distance (mm), y-axis: relative transmittance (%), 1: sample film data of Example 1, 2: sample film data of Example 2, and 3: sample film data of Example 3).

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Throughout the present disclosure, the phrase "combination(s) thereof" included in a Markush-type expression denotes one or more mixtures or combinations selected from the group consisting of components stated in the Markush-type expression, that is, denotes that one or more components selected from the group consisting of the components are included.

In this application, "B being placed on A" means that B is placed in direct contact with A or placed over A with another layer or structure interposed therebetween and thus should not be interpreted as being limited to B being placed in direct contact with A, unless the description clearly dictates.

An object of the present disclosure is to provide a film for glass lamination having a color change zone with a natural gradation so that can enhance an effect of preventing blinding light and improve penetration resistance of a laminated glass.

The film for glass lamination and a laminated glass including the same of the present disclosure have a natural color gradation in a color change zone placed between a clear zone and a colored zone so that have a blinding light preventing effect and esthetic appreciation that are enhanced, and penetration resistance of a laminated glass applied with the same can also be improved.

The present disclosure discloses a method for inducing a shade band formed in a film for glass lamination to have a more natural color variation in a color change zone placed between a clear zone and a colored zone. During our research, it is recognized that when one, two, or more colored layers are comprised in a film for glass lamination in the form of shade band, and a color change zone comprises a fade off zone of which distance is 10 mm or more whose relative transmittance (Rt) is 30 to 80%, a natural gradation is formed; thereby, preventing blinding light caused from the external light can be enhanced without degradation of durability.

Hereinafter, the present disclosure will be described in further detail.

Figure 1:
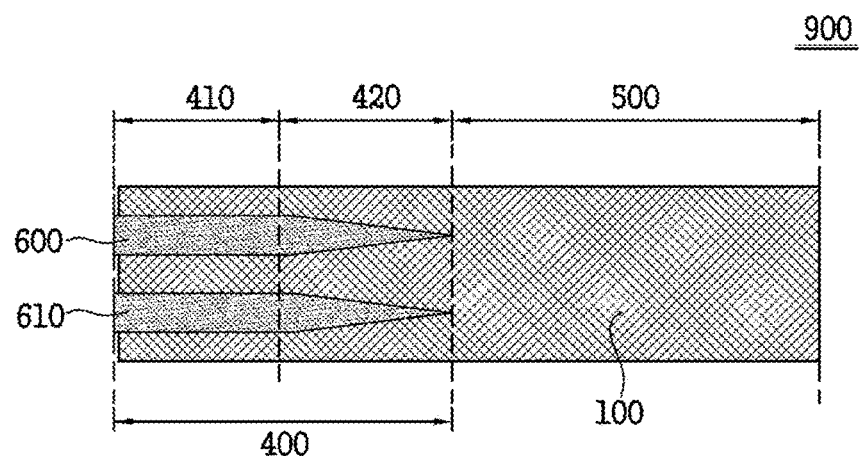
FIGS. 1 and 2 are conceptual views illustrating cross-sections of examples of a film for glass lamination.
Figure 2:
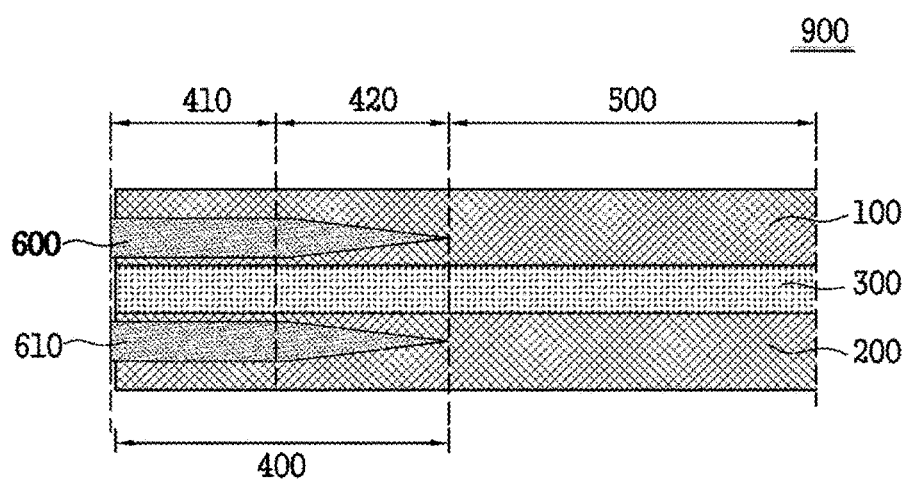
Figure 3:
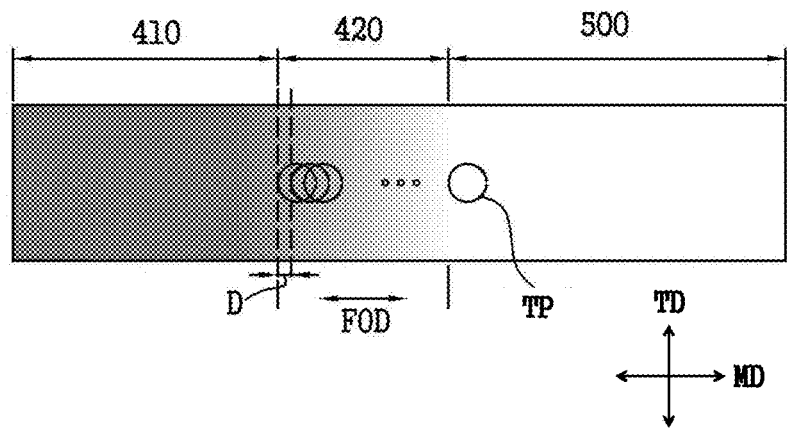
FIG. 3 is a conceptual view illustrating an example of measuring transmittance in a color change zone.

FIGS. 1 and 2 are conceptual views illustrating cross-sections of an example of a film for glass lamination, respectively. FIG. 3 is a conceptual view illustrating an example of measuring transmittance in a color change zone. (a) and (b) of FIG. 4 are conceptual views illustrating the thickness of cross-sections of an example of a film for glass lamination. With reference to FIGS. 1 to 4, a film for glass lamination 900 according to the present disclosure will be described.

A film for glass lamination 900, according to one embodiment of the present disclosure, comprises a tinted zone 400 placed in some of the film and a clear zone 500, which is an area excepting the tinted zone.

The tinted zone 400 may be formed in some or the whole of the film 900, but specifically formed in some thereof. The tinted zone 400 may comprise colored layers 600 and 610 to have a general wedge form when observed in the cross-section and to have a shade band form when the front of the film is observed in the top in the film 900.

The tinted zone 400 may comprise a colored zone 410 having a fixed color, and a color change zone 420 placed between the colored zone 410 the clear zone 500 and varied in the density of color.

The tinted zone 400 may comprise a first colored layer 600 and a second colored layer 620 disposed below the first colored layer 600 to be distinct.

The colored zone 410 is a zone where color conversion is completed, showing the lowest transmittance, and has a substantially fixed color.

The color change zone 420 is a zone in which the density of the color varies, placed between the colored zone 410 and the clear zone 500 and may comprise a fade off zone of which distance is 10 mm or more whose relative transmittance (Rt, %) indicated by below Equation 1 is 30 to 80%.

$$Rt = \frac{To}{Tc} \times 100 \qquad \text{[Equation 1]}$$

In Equation 1, To is a transmittance in a tinted zone, and Tc is a transmittance in a clear zone.

The transmittance (To) of the tinted zone 400 and the transmittance (Tc) of the clear zone are evaluated based on visible ray transmittance (Tv) and, in detail, evaluated by transmittance measured by using a wavelength between 380 to 780 nm.

The transmittance in the tinted zone (To) is a transmittance in a zone that is not a clear zone and has a value of the lowest transmittance or a value between the lowest transmittance and the highest transmittance. Meanwhile, transmittance in the clear zone 500 has the highest transmittance. The clear zone 500 may have a transmittance of 80% or more, 85% or more, or 85 to 99%.

The colored zone 410 within the tinted zone is a zone in which a colored layer in a comparatively regular thickness is applied and thereby has a color with a fixed density, having the lowest transmittance within the entire film for glass lamination. The transmittance of the tinted zone may be 30% or less, 20% or less, or 1 to 12%.

The color change zone 420 is a zone where the color density gradually varies between a comparatively thick color of the colored zone and a substantially transparent color of the clear zone. The density of the color may be evaluated as having a transmittance varying depending on the position for measuring.

In detail, the color change zone 420 refers to the zone from a target position for measuring, which is a border with the colored zone 410, whose color is the thickest and in which the measured color density gradually becomes thinner depending on the moving of the target position (TP), and continuedly becomes thinner as closer to the clear zone 500, to a position meeting the clear zone in which the dolor density becomes the minimum.

In detail, the color change zone 420 refers to the zone from a target position for measuring, which is a border with the colored zone 410, whose transmittance is the lowest and in which the measured transmittance gradually becomes higher depending on the moving of the target position (TP), and continuedly becomes higher as closer to the clear zone 500, to a position meeting the clear zone in which the transmittance becomes the maximum.

According to the present disclosure, the color change zone 420 comprises a fade-off zone, and the fade-off zone has a relative transmittance (Rt, %) of 30 to 80%. A range of 25 to 75% is a transmittance range evaluated as having comparatively good visibility based on visible ray transmittance. Still, the range of transmittance may be evaluated to be somewhat different depending on a film, so that the concept of relative transmittance is introduced and a range of 30 to 80% is applied as the fade-off zone.

Here, relative transmittance refers to a relative ratio value of transmittance in a tinted zone 400 for transmittance in a clear zone 500, and it is calculated by above Equation 1.

According to the present disclosure, a color change zone 420 comprises a fade off zone (FOD) which has a distance of 10 mm or more, in detail, 12 mm to 30 mm, in further detail, 15 mm to 25 mm. When it comprises the fade-off zone in such distance, a gradation pattern can be formed due to natural color variation. A film for glass lamination with an enhanced effect of preventing blinding light caused by the eternal light and enhanced esthetic appreciation can be provided.

Here, fade off zone (FOD) refers to a distance from a position whose relative transmittance becomes 80% or less to a position whose relative transmittance becomes 30% or more, and is calculated based on the shortest distance.

With reference to FIG. 3, a transmittance in a color change zone 420 may be evaluated by measuring transmittance in a transverse direction of a film with a constant measurement interval (D).

The measurement interval (D) may be 1 to 10 mm, in detail, 3 to 5 mm. When the measurement interval (D) is narrow, neighboring target positions for measuring may be overlapped in some parts.

The film for glass lamination 900 may have a conformity index value of 100 or more according to below Equation 2.

$$Qc=FOD*T\max \quad [\text{Equation 2}]$$

In Equation 2, Qc refers to the conformity index, FOD is a distance (mm) of the fade off zone, and T max is a transmittance (%) in the colored zone.

The conformity index value considers a light transmittance of a colored zone and a distance of the fade-off zone. A value considering that when a thick color whose light transmittance is low is applied, a large distance value of the fade off zone is suitable for forming a natural color change zone. When a comparatively thin color whose light transmittance is high is applied, a natural color change zone can be formed, although the distance value of the fade-off zone is relatively short.

The film for glass lamination 900 may have, in detail, the conformity index value of 100 or more, 120 or more, or 130 to 400. A color change zone with more excellent esthetic appreciation can be formed when having the conformity index value in this range.

The tinted zone 400 may comprise one, two, or more colored layers disposed above and below each other when observed based on a cross-section of a film.

When the tinted zone 400 comprises two or more colored zone, the colored zones may be a first colored layer 600 and a second colored layer 610, and the colored layers respectively comprise a coloring agent.

In detail, the colored layers 600 and 610 may respectively comprise a polyvinyl acetal resin, a coloring agent, a plasticizer, and a trioxane-based compound.

As a color applied to a shade band of a film for glass lamination 900, a preference for blue tone is high. Such color of the shade band may be a middle color between violet and blue, and for this, at least two, three, or more, or four or more coloring agents may be applied together. Any coloring agent applicable to a film for glass lamination may be applied as the coloring agent without limit.

An amount of a coloring agent in the second colored layer 610 may be larger than a coloring agent in the first colored layer 600. When two or more colored layers are applied, and the amount of a coloring agent in these two layers is different, adjusting a color density to be more natural may be possible.

An amount of a plasticizer contained in the second colored layer 610 may be larger than a plasticizer contained in the first colored layer 600. When two or more colored layers are applied, and the amount of a plasticizer contained in these two layers is different, it may be possible to maintain the penetration resistance of the film for glass lamination 900 above a certain level, even allowing a color density to be naturally adjusted as desired.

The first colored layer 600 and the second colored layer 610 may differ in density or viscosity of a coloring agent inside a resin and show a difference in absolute transmittance. In detail, the difference of the absolute transmittance may be 30% or less; in further detail, 25% or less, or 5 to 25%.

The first colored layer 600 and the second colored layer 610 have a first width and a second width, respectively, that are widths from one side to the other side in a transverse direction (TD), and the first width and the second width may be substantially the same or different.

The colored layers 600 and 610 may comprise a trioxane-based compound for the coloring agent to be dispersed evenly and stably inside a colored layer comprising the polyvinyl acetal resin and the plasticizer together.

The trioxane-based compound may be one or more within a trioxane-based compound having 1,3,5-trioxane skeleton, a trioxane-based compound having 1,2,4-trioxane skeleton, and a trioxane-based compound having 1,2,3-trioxane skeleton.

The trioxane-based compound may be one having the 1,3,5-trioxane skeleton in which one to three carbon atoms out of the three carbon atoms comprised in the skeleton may independently have hydrogen or alkyl group having one to five carbon atoms, respectively, as having a structure of Formula 1 below.

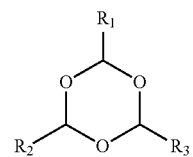

[Formula 1]

In Formula 1, the $R_1$, $R_2$, and $R_3$ are independently hydrogen or alkyl group having one to five carbon atoms, respectively.

Specifically, the $R_1$, $R_2$, and $R_3$ are independently hydrogen or alkyl group having one to five carbon atoms, respectively, and the $R_1$, $R_2$, and $R_3$ are not hydrogen at the same time.

In the case of applying trioxane-based compound in this manner to the film for glass lamination, a hydrophilic part derived from a trioxane skeleton, and a hydrophobic part derived from an alkyl group of $R_1$ to $R_3$ are present together, thereby improving stability when a coloring agent and a plasticizer are mixed.

The trioxane-based compound may be trialkyl trioxane, and in detail may be any one selected from the group consisting of 2,4,6-trimethyl-1,3,5-trioxane, 2,4,6-triethyl-1,3,5-trioxane, 2,4,6-tri(n-propyl)-1,3,5-trioxane, 2,4,6-tri(iso-propyl)-1,3,5-trioxane, 2,4,6-tri(n-butyl)-1,3,5-trioxane, 2,4,6-tri(sec-butyl)-1,3,5-trioxane, 2,4,6-tri (isobutyl)-1,3,5-trioxane, 2,4,6-tri(tert-butyl)-1,3,5-trioxane, 2,4,6-tripentyl-1,3,5-trioxane, and a combination thereof.

The trioxane-based compound may be a trioxane-based compound having carbon atoms of 9 or more, 9 to 21, or 9 to 15. Specifically, trialkyl trioxane may be tripropyl trioxane, and in detail may be any one selected from the group consisting of 2,4,6-tri(n-propyl)-1,3,5-trioxane, 2,4,6-tri(iso-propyl)-1,3,5-trioxane, and a combination thereof.

As a trioxane-based compound of the present disclosure, the trialkyl trioxane having carbon atoms of 9 to 15 is desirable to be applied. In this case, dispersion stability can be improved by characteristics of a trioxane-based compound having intermediate properties between a coloring agent and a plasticizer in a coloring agent dispersion liquid.

The trioxane-based compound may be contained in an amount of 0.001 to 5 wt %, or 0.001 to 3 wt % based on the entire colored layer. When the trioxane-based compound is comprised in this range of the amount, re-coagulation of a coloring agent can be more efficiently prevented, and the re-coagulation phenomenon, which can occur during mixing with a polyvinyl acetal resin, can be decreased as well as obtaining storage stability of a dispersion liquid for coloring.

Two or more coloring agents may be mixed and applied to the coloring agent, or a pigment mixture comprising at least four or more coloring agents may be applied. In detail, the coloring agent may be applied by mixing red, green, blue, yellow, and so on, and the type is not limited.

As a red coloring agent, quinacridone red, monoazo red, polyazo red, pyranthrone red, antanthrone bromide red, perylene red, beta naphthol red, quinaoridone red, anthraquinone red, toluidine red, and so on may be applied, and specifically quinacridone red may be applied.

As a green coloring agent, a phthalocyanine-based pigment comprising copper phthalocyanine green, copper phthalocyanine bromide green, and the like; chrome oxide green, chrome green, metal complex azo green, and so on may be applied, and specifically a phthalocyanine-based pigment may be applied.

As a blue coloring agent, copper phthalocyanine blue, prussian blue, cobalt blue, indanthrone blue, ultramarine blue, and metal frit palocyanine blue may be applied, and specifically phthalocyanine blue may be applied.

As a yellow coloring agent, azo yellow, such as monoazo yellow, polyazo yellow, monoazo benzimidazolone yellow, metal complex azo yellow; benzimidazole yellow, quinacridone gold, isoindolin yellow, anthrapyramidine yellow, flavanthrone yellow, quinophthalone yellow, anthraquinone yellow, chrome yellow, and the like, and specifically, azo yellow may be applied.

As the coloring agent, a mixed pigment may be applied by mixing a green coloring agent in an amount of 0.1 to 2 parts by weight, a blue coloring agent in an amount of 0.1 to 2 parts by weight, and a yellow pigment in an amount of 0.1 to 2 parts by weight based on the red pigment of 1 part by weight.

The coloring agent may be a pigment having a particle size of 150 nm or less, or 10 to 100 nm.

The coloring agent may comprise an amount of 0.001 to 5 wt %, 0.005 to 3 wt %, or 0.01 to 2 wt % based on the entire colored layer. The amount of a coloring agent comprised in the colored layer may be controlled by adjusting the amount of the coloring agent applied to the colored layer considering the desired intensity of a color, light transmittance, and the like to be obtained in a tinted zone of the film overall.

The colored layer may comprise the coloring agent and the trioxane-based compound in a weight ratio of coloring agent to trioxane-based compound of 1:0.001 to 3. When the trioxane-based compound is comprised in an amount of less than 0.001 based on the coloring agent of 1 part by weight, dispersion stability may not be sufficient. When the trioxane-based compound is comprised in an amount of more than 3 parts by weight, the degree of improving dispersion stability obtained by adding a trioxane-based compound may be insignificant.

The colored layer may comprise the coloring agent and the trioxane-based compound in a weight ratio of coloring agent to trioxane-based compound of 1:0.05 to 2, or of 1:0.05 to 1.5. When the coloring agent and the trioxane-based compound are applied in this range, other physical properties of the film for glass lamination and the effect of improving the dispersion stability of the coloring agent can be obtained harmoniously.

The coloring agent comprised in the colored layer may be applied to the formation of the colored layer by first applied as a form of a first dispersion liquid for coloring comprising a coloring agent, a plasticizer, and a trioxane-based compound by applying a trioxane-based compound first and then mixing with a polyvinyl acetal resin.

The coloring agent comprised in the colored layer may be applied to form the colored layer by being prepared in a second dispersion liquid for coloring comprising a coloring agent and a plasticizer, after that being mixed with a polyvinyl acetal resin mixture comprising a trioxane-based compound. Also, the first dispersion liquid for coloring comprising a trioxane-based compound and the polyvinyl acetal resin mixture comprising the trioxane-based compound may be applied together as the coloring agent comprised in the colored layer to form a colored layer. The coloring agent comprised in the colored layer may be applied in the form of a first dispersion liquid for coloring comprising a coloring agent, a plasticizer, and a trioxane-based compound. Here, description on the coloring agent and the trioxane-based compound is the same as the above description.

The plasticizer may be selected from the group consisting of triethylene glycol bis 2-ethylhexanoate (3G8), tetraethylene glycol diheptanoate (4G7), triethylene glycol bis 2-ethylbutyrate (3GH), triethylene glycol bis 2-heptanoate (3G7), dibutoxyethoxyethyl adipate (DBEA), butyl carbitol adipate (DBEEA), dibutyl sebacate (DBS), bis 2-hexyl adipate (DHA) and a mixture thereof. Specifically, triethylene glycol bis 2-ethylhexanoate (3G8) may be applied as the plasticizer.

The plasticizer may be comprised in an amount of 68 to 98 wt % based on the entire first dispersion liquid. When colored layers 600 and 610 of a polyvinyl acetal film are formed by preparing a first dispersion liquid containing a plasticizer, convenience and workability in manufacturing processes can be increased. In addition, the first dispersion liquid for coloring prevents coagulation of the coloring agent and helps to manufacture a film with an even hue because a plasticizer and a coloring agent are applied with a trioxane-based compound which serves as a dispersion stabilizer.

In general, when a coloring agent in powder form is added to a plasticizer in liquid form, a wetting process covering the surface of coloring agent particles covered with air and moisture in the air, with the plasticizer, is required. The wetting process is carried out by dispersing the coloring agent particles inside a plasticizer with strong physical force such as grinding and milling. At this time, the particles of the coloring agent having considerably small size get to have an unstable state in which the surface area and surface free energy are increased. Particularly, when compatibility between a plasticizer and a coloring agent is not good, from this unstable state, the force to return to a stable state in which the surface area is small is generated, and the re-coagulation phenomenon of the coloring agent may occur partially or overall due to this force. Besides, this re-coagulation phenomenon is thought to be one cause of uneven color development, degradation of storage stability of the coloring agent dispersion liquid, and the like.

In the present disclosure, these problems were solved by applying a trioxane-based compound. In detail, by adding an alkyl group with non-polarity to a trioxane skeleton with polarity, the dispersion can stabilize between a coloring agent and a plasticizer having different properties from each other. The trioxane-based compound may comprise 0.1 to 30 wt % based on the entire first dispersion liquid for coloring.

The coloring agent may be comprised in an amount of 1 to 10 wt % based on the entire first dispersion liquid for coloring. If the coloring agent dispersion liquid comprises the coloring agent in this range of content, the coloring agent's dispersion stability can be improved. Simultaneously, when the first dispersion liquid for coloring is mixed with a polyvinyl acetal resin, the workability can be more elevated.

The first dispersion liquid for coloring comprises the coloring agent, the trioxane-based compound, and so on. After being mixed with a plasticizer, it passes through a physical mixing process such as grinding or ball milling. In detail, the first dispersion liquid for coloring grinds the coagulated particles of coloring agent by the method of ball milling after mixing respective ingredients, to be dispersed inside the dispersion liquid evenly. In further detail, the first dispersion liquid for coloring may be prepared through a dispersion process of ball milling for 30 minutes or more by using a zirconium oxide ball having a diameter of 1 mm or less.

The first dispersion liquid for coloring may be one whose coagulation does not occur for 30 days or more after being prepared. The case of the dispersion liquid whose coagulation does not occur for a comparatively long period like this means that the dispersion liquid has improved storage stability, and convenience for work may be more elevated during manufacturing a film for glass lamination.

The coloring agent dispersion liquid may be applied in 2 to 75 parts by weight, or 5 to 55 parts by weight based on the polyvinyl acetal resin of 100 parts by weight. In such a case, the polyvinyl acetal film can obtain physical properties as a film for glass lamination and simultaneously can obtain even color stably.

The polyvinyl acetal may be a polyvinyl acetal obtained by acetalization of a polyvinyl alcohol having a degree of polymerization of 1,600 to 3,000 with aldehyde, or may be a polyvinyl acetal obtained by acetalization of polyvinyl alcohol having a degree of polymerization of 1,700 to 2,500 with an aldehyde. When such a polyvinyl acetal is applied, mechanical properties like penetration resistance can be sufficiently improved.

The polyvinyl acetal may be one synthesized from polyvinyl alcohol and aldehyde, and the type of aldehyde is not limited. In detail, the aldehyde may be any one selected from the group consisting of n-butyl aldehyde, isobutyl aldehyde, n-valer aldehyde, 2-ethyl butyl aldehyde, n-hexyl aldehyde, and a blend resin thereof. When n-butyl aldehyde is applied as the aldehyde, the produced polyvinyl acetal resin may have a characteristic in refractive index, the difference of which with a refractive index of glass is small, and a characteristic in excellent adhesion with glass and the like.

The coloring agent comprised in the colored layer may be applied to form the colored layer by being prepared in a second dispersion liquid comprising a coloring agent and a plasticizer, and mixed with a polyvinyl acetal resin mixture.

Also, the coloring agent comprised in the colored layer may form the colored layer by the first dispersion liquid for coloring comprising a trioxane-based compound and the polyvinyl acetal resin mixture comprising the trioxane-based compound applied together.

The colored layer may comprise a polyvinyl acetal resin mixture comprising a polyvinyl acetal resin and a trioxane-based compound.

A polyvinyl acetal resin mixture comprising the trioxane-based compound may be applied to the colored layer together or separately with a first dispersion liquid for coloring.

The trioxane-based compound may be mixed with a polyvinyl acetal resin comprised in the colored layer, thereby being comprised in the tinted zone.

The trioxane-based compound may be mixed with the polyvinyl acetal resin to prepare a polyvinyl acetal resin mixture. A mixture of the polyvinyl acetal resin and the trioxane-based compound may be extruded with the first dispersion liquid for coloring or the second dispersion liquid for coloring, thereby forming the colored layer. In this time, a trioxane-based compound mixed in the polyvinyl acetal resin mixture can improve compatibility between the plasticizer comprised in the dispersion liquid for coloring and the polyvinyl acetal resin. Accordingly, dispersion of the coloring agent inside the colored agent can be improved.

In addition, the trioxane-based compound may not be comprised in the coloring agent dispersion liquid, and the polyvinyl acetal resin and a polyvinyl acetal resin mixture comprising the trioxane-based compound are extruded together with the second dispersion liquid for coloring, thereby forming the colored layer.

Here, the plasticizer, polyvinyl acetal resin, trioxane-based compound, coloring agent, the applied ratio of coloring agent to trioxane-based compound, and so on are overlapped with the above description, and thus further detailed description is omitted.

The first layer 100 may comprise a first polyvinyl acetal and a first plasticizer.

The first polyvinyl acetal has a hydroxyl group of 30 mol % or more and an acetyl group of 5 mol % or less. In detail, the amount of hydroxyl group may be 30 to 50 mol %, and the amount of acetyl group may be 2 mol % or less. The first polyvinyl acetal resin may have a weight average molecular quantity in a value of 200,000 to 300,000. When a polyvinyl acetal with these characteristics is applied as the first polyvinyl acetal, it is possible to manufacture a film for glass lamination with excellent adhesion with glass and whose mechanical strength is excellent.

The description on the first plasticizer is overlapped with the above description on a plasticizer, and thus, further description is omitted.

The first layer 100 may comprise a plasticizer and a first polyvinyl acetal. It may be a film formed by melt-extruding a composition for a first surface layer further comprising other additives described below in a required range.

The film for glass lamination 900 may have a cross-section structure like FIG. 1 when comprising a first layer 100 and colored layers 600 and 610 as shade bands.

The film for glass lamination 900 may further comprise a first layer 100, colored layers 600 and 610 as shade bands, and a second layer 200, and may further comprise a third layer 300 placed between the first layer 100 and the second layer 200. The third layer 300 placed between the first colored layer 600 and the second colored layer 610, may be further comprised. In such a case, the film for glass lamination may have a cross-section structure like FIG. 2.

The second layer 200 may comprise a second polyvinyl acetal resin and a second plasticizer, and when required, may further comprise an additive described below. The second polyvinyl acetal resin and the second plasticizer may be the same as the first polyvinyl acetal resin and the first plasticizer described above.

The third layer 300 may be a function layer placed between the first layer 100 and the second layer 200 for giving functionality to the film for glass lamination 900. In detail, the function layer may be a functional layer having functionality such as sound insulation functionality, heat insulation functionality, head up display (HUD) functionality, or the like.

When the third layer 300 is a functional layer having sound insulation functionality, the third polyvinyl acetal may have a hydroxyl group of 40 mol % or less and an acetyl group of 8 mol % or more, or a hydroxyl group of 1 to 30 mol % and an acetyl group of 1 to 15 mol %. When a polyvinyl acetal having such a characteristic is applied, it is possible to manufacture a polyvinyl acetal film having a sound insulation characteristic. The third layer 300 may comprise a third plasticizer together, and the third plasticizer may be contained in an amount of 30 to 45 wt % to a function layer having the sound insulation functionality. The kind of the third plasticizer is overlapped with the kind of plasticizer described above, and thus further description is omitted.

When the third layer 300 is a functional layer having HUD functionality, the third layer 300 may have a wedge shape overall. This wedge shape can substantially prevent forming a double image when applied to display in a laminated glass 950 in which the film for glass lamination 900 is bonded.

The difference of weight average molecular quantity value between the third polyvinyl acetal resin and the first polyvinyl acetal resin may be 250,000 to 500,000, 300,000 to 500,000, or 450,000 to 500,000. When having such a difference in weight average molecular quantity, the manufactured film can have a more excellent characteristic in adjusting extruding temperature during processes, and mechanical properties can be more excellent.

The third polyvinyl acetal may have a PDI (polydispersity index) value of 3.5 or less, 1.2 to 2.5, or 1.9 to 2.3.

The third polyvinyl acetal resin may have a melt index of 5 to 45 g/10 min according to ASTM D1238 (in the condition of 150° C., 21.6 kg and 37% Kneader). In detail, a melt index of the third polyvinyl acetal resin may be 6 to 35 g/10 min, 7 to 25 g/10 min, 8 to 15 g/10 min, or 8.5 to 12.5 g/10 min. When a third polyvinyl acetal resin having such a melt index is applied, process stability can be more improved.

The third polyvinyl acetal resin may have a viscosity (5% BuOH Sol.) value of 250 to 900 cP or 500 to 750 cP, according to JIS K6728. When satisfying such a viscosity condition, it is possible to enhance the mechanical properties of a film and process efficiency during melt-extruding to be more.

The plasticizer of the third layer 300 may be the same as the plasticizer applied to the first surface layer 100. The detailed description of the kind of plasticizer is overlapped with the above description, and thus further description is omitted.

The colored layers 600 and 610 may form multiple shade bands, forming a tinted zone in some area of a film for glass lamination 900.

The film for glass lamination 900 may further comprise an additive selected from the group consisting of an antioxidant, a heat stabilizer, a UV absorber, a UV stabilizer, an IR absorber, a glass adhesion regulator, and a combination thereof. The additive may be comprised of at least one layer within the respective layers as above. Due to the additive, long-term durability, such as thermal stability and light stability, and the anti-scattering performance of the film can be improved.

As the antioxidant, a hindered amine-based antioxidant or a hindered phenol-based antioxidant may be used. Specifically, in the process of manufacturing polyvinyl butyral (PVB), which needs a processing temperature of 150° C. or higher, a hindered phenol-based antioxidant is further preferable. The hindered phenol-based antioxidant may, for example, be IRGANOX 1076, 1010, or so on available from BASF SE.

As the heat stabilizer, a phosphite-based heat stabilizer may be used, considering suitability with an antioxidant. The heat stabilizer may, for example, be IRGAFOS 168 available from BASF SE.

As the UV absorber, Chemisorb 12, Chemisorb 79, Chemisorb 74, or Chemisorb 102 available from CHEMIPRO KASEI KAISHA, LTD may be used, or Tinuvin 328, Tinuvin 329, or Tinuvin 326 or so on available from BASF SE may be used. As the UV stabilizer, Tinuvin or so on available from BASF SE may be used. As the IR absorber, ITO, ATO, AZO, or so on may be used, and as the glass adhesion regulator, a metal salt such as magnesium (Mg), potassium (K), sodium (Na), epoxy-based modified silicon (Si) oil, or a mixture thereof may be used. Still, the present application is not limited thereto.

With reference to FIG. 4, the film for glass lamination 900 may have a total thickness (Tz) of 0.4 mm or more, in detail, 0.4 to 1.6 mm, 0.5 to 1.2 mm, or 0.6 to 0.9 mm. The film for glass lamination is applied to the manufacture of laminated glass; therefore, mechanical strength or sound insulation performance may be enhanced as the thickness increases. However, considering minimal regulation performance, cost, and weight reduction, the range of thickness as the above is suitable for the manufacture of the film satisfying various conditions.

The thicknesses of the first layer 100 and the second layer 200 may be respectively 250 to 400 µm, or 300 to 350 µm. The thickness of the third layer 300 may be 100 to 150 µm, or 120 to 130 µm. The thicknesses $Tz_1$ and $Tz_2$ of the colored layers 600 and the 610 may be 100 to 200 µm, or 140 to 160 µm. When the thickness is applied as these ranges, it is possible to prepare a film for glass lamination 900 comprising a shade band, which satisfies mechanical properties such as penetration resistance and shows an excellent color variation characteristic.

A method of manufacturing a film for glass lamination according to another embodiment comprises a melting operation of preparing a molten resin by melting a resin composition for colored layers and a resin composition for non-colored layers; and an extruding operation of manufacturing a film for glass lamination comprising one, two, or more colored layers having a wedge shape by inducing the molten resin to flow into a laminating mean.

In manufacturing a film for glass lamination, the melting operation is for putting a resin composition for non-colored layers into a first extruder and putting a resin composition for colored layers into a second extruder to be melted, respectively.

Here, the resin composition for non-colored layers forms a first layer 100 or forms a first layer 100, a second layer 200, and a third layer 300. The resin composition for colored layers is a composition for forming colored layers 600 and 610. The detailed description about composition and the like applied to each manufacture of the first layer 100, the second layer 200, the third layer 300, and the colored layers 600 and 610 is overlapped with the above description, and thus further description is omitted.

Next, the extruding operation is for inducing a molten resin melted in the melting operation to flow into a laminating mean connected to the first extruder and the second extruder and thereby extruding a molten resin to form a film.

Here, the laminating mean may be a feed block, and the second extruder may form a colored layer comprising a wedge shape by being connected to a feed bock with a wedge shape.

When trying to embody a colored layer additively, a separate third extruder may be additively connected to form a colored layer with a different composition, or a feed block may be allowed to embody a wedge shape separately from the above, and thereby the manufacture can be made.

Multilayer films of various layers and forms may be applied to the feed block, and such a multilayer structure can be adjusted in the feed block.

The present disclosure is described based on a feed block. Still, a multi-manifold is also applicable, and any one usable in the industry as a laminating mean is applicable without limit. A feed block and the like with a typical structure may be applied to the detailed composition of the feed block and the like, and thus the detailed description is omitted.

The film for glass lamination 900 manufactured in this manner may comprise a tinted zone 400 in which the colored layers 600 and 610 are placed, and a clear zone 500.

The tinted zone 400 may comprise a colored zone 410 having a fixed color and a color change zone 420 placed between the colored zone 410 and the clear zone 500 and where the density of the color varies.

In the tinted zone 400, one, two, or more colored layers having a wedge shape overall when observed in a cross-section are comprised.

Here, the 'wedge shape' of the colored layer refers to a gradually narrower shape from wide one end of the colored zone to one end of the clear zone. In detail, a shape in which the thickness of a part showing a fixed color in the colored zone is substantially constant and the cross-section is gradually narrower from a start point of the color change zone is referred to as the wedge shape. The colored layer comprising such a wedge shape allows color variation to be made continuously without unevenness of the color in the color change zone 420.

The color change zone 420 may comprise a zone where a fade off zone whose relative transmittance (Rt, %), indicated by Equation 1, is 30 to 80% has a fade off distance of 10 mm or more.

$$Rt = \frac{To}{Tc} \times 100 \quad \text{[Equation 1]}$$

In Equation 1, To is a transmittance in a tinted zone, and Tc is a transmittance in a clear zone.

The detailed description of the transmittance of the tinted zone and the clear zone and the resin composition is overlapped with the above description, and thus further description is omitted.

FIG. 5 is a conceptual view for illustrating a cross-section of a laminated glass according to one embodiment of the present disclosure, and FIG. 6 is a conceptual view for illustrating an image of a laminated glass applied to an automobile as one example of a vehicle according to one embodiment of the present disclosure. Hereinafter, with reference to FIGS. 5 and 6, a light transmission laminate and a vehicle will be described.

A light transmission laminated 950, according to another embodiment of the present disclosure will be described. The light transmission laminate 950 may comprise a laminate in which a film for glass lamination 900 described above is placed between two pieces of light transmission layer 10 and 20.

The two pieces of light transmission layer 10 and 20 may be specifically glass, but any light transmission panel is applicable; for example, a material such as plastic may be applied.

Descriptions on the detailed structure, composition, characteristics, method of manufacture, and so on are overlapped with the above description, and thus further description is omitted.

A laminated glass 950, one example of a light transmission laminate, is applied as a windshield to an automobile 800 in an example of a vehicle according to another embodiment of the present disclosure.

The windshield blocks external wind and allows external visibility by the vehicle's driver. The laminated glass 950 described above may be applied as the windshield.

The vehicle 800 comprises a main body, an engine, a drive wheel attached to be rotatable to the body, a connector connecting the drive wheel and engine to the driver, and a windshield attached to a part of the body.

Any vehicle with a windshield may be vehicle 800. In an example, the vehicle 800 may be an automobile.

For example, vehicle 800 may include the laminated glass 950 as a front windshield with excellent light transmission performance, impact resistance, penetration resistance, and high-temperature sound insulation performance to the entire laminated glass 950 while retaining excellent optical properties.

Hereinafter, detailed embodiments of the present disclosure will be described in further detail.

(Manufacture of a Film for Glass Lamination)

1) Preparation of a Polyvinyl Acetal Resin

Preparation of a Polyvinyl Butyral Resin: A polyvinyl alcohol resin having an average polymerization degree of 1700 and a saponification degree of 99% was mixed with n-butyl aldehyde, thereby preparing a polyvinyl butyral resin having a butyral group of 56.1 mol % and a hydroxyl group of 43.0 mol %.

2) Preparation of an Additive Mixture

IRGANOX 1010 and IRGAFOS168 of 0.1 parts by weight respectively, TINUVIN P of 0.3 parts by weight, potassium acetate (K ac) of 0.022 parts by weight, and magnesium acetate (Mg Ac) of 0.028 parts by weight were mixed, thereby preparing an additive mixture of 0.55 parts by weight.

3) A Method of Preparing a Dispersion Liquid for Coloring

A coloring agent mixture was mixed with a trioxane-based compound and a plasticizer in liquid form, thereby preparing a dispersion liquid for coloring. The detailed composition of the coloring agent mixture, the trioxane-based compound, and the plasticizer is shown in Table 1 below.

The coloring agent dispersion liquid is prepared by using ROTATE RING MILL available from ARMSTEC. INC. CO., LTD. As beads charged inside a vessel, zirconium oxide with a size of 0.5 mm was used, and grinding and dispersing of the coloring agent were carried out at the same time for 30 minutes, after setting the rate of an internal stirrer (AGITATOR) to be 1500 RPM and setting the rate of an external stirrer to be 100 RPM.

As the coloring agent, GREEN: Pigment green 7 (CITY CAT OVERSEAS CHEMICALS LTD), BLUE: Pigment blue 15:3 (HANGZHOU XCOLOR CHEMICAL COMPANY), RED: Pigment red 122 (LILY GROUP CO., LTD), YELLOW: Pigment yellow 74 (HERMETA CORPORATION CO., LTD) were applied, respectively.

TABLE 1

| Coloring Agent Dispersion Liquid No. | Coloring Agent (Parts by Weight) | | | | Dispersion Stabilizer (Parts by Weight) Tripropyl Trioxane (2,4,6-Tripropyl-1,3,5-trioxane) | Plasticizer (Parts by Weight) 3G8 (Triethylene glycol 2-ethyl hexanoate) |
|---|---|---|---|---|---|---|
| | RED | GREEN | BLUE | YELLOW | | |
| A | 1.8 | 0.6 | 0.9 | 0.6 | 1 | 95.1 |
| B | 1.44 | 0.48 | 0.72 | 0.48 | 1 | 95.88 |

2) Manufacture of Films for Glass Lamination (Manufacture of a Film of Example 1)

An additive mixture of 0.55 parts by weight, a polyvinyl butyral resin of 71.95 parts by weight, and a 3G8 plasticizer of 27.50 parts by weight were put into a twin-screw first extruder (A) to be melted and extruded, an additive mixture of 0.55 parts by weight, a polyvinyl butyral resin of 71.05 parts by weight, and a dispersion liquid for coloring (A) of 28.25 parts by weight were put into a twin-screw second extruder (B) to be melted and extruded, and an additive mixture of 0.55 parts by weight, a polyvinyl butyral resin of 71.05 parts by weight, and a dispersion liquid for coloring (b) of 28.25 parts by weight were put into a twin-screw third extruder (C) to be melted and extruded.

A resin extruded in the extruder was formed into a film with the same structure of FIG. 1 through a feed block and a T-die, thereby manufacturing a sheet with a width of 1.2 m and a thickness of 760 μm. From both end portions of the manufactured film, 0.1 m was cut (trimmed), and finally, a film with a width of 1 m was winded on a roll, thereby obtaining a sample in Example 1.

(Manufacture of a Film of Example 2)

It was manufactured in the same manner as in Example 1 except putting a polyvinyl butyral resin of 71.95 parts by weight, and 3 G8 plasticizer of 27.50 parts by weight into a twin-screw first extruder (A), and putting an additive mixture of 0.55 parts by weight, a polyvinyl butyral resin of 71.05 parts by weight, and a dispersion liquid for coloring (A) of 28.25 parts by weight into a twin-screw second extruder (B) for use.

(Manufacture of a Film of Example 3)

Though it was manufactured in the same manner as in Example 2, a dispersion liquid (B) is used as a dispersion liquid for coloring.

(Property Evaluation of Films for Glass Lamination)

i) Transmittance Measurement

For accurate measurement of transmittance, it is required to minimize unevenness of the surface by adding heat to a target film to be measured.

In detail, after removing unevenness of the surface by pressuring for 8 minutes in a laminator at 150° C., measuring the total light transmittance by using KS A 0066 standard and measuring transmittance with a visible light having a wavelength of 380 to 780 nm were performed thereby finding a visible light transmittance (Tv).

The transmittance of a film was measured with a measurement interval (D) of 3 mm from a clear zone 500, which is a point having the highest transmittance in the film and designated as '0' to a starting point where the transmittance becomes the minimum. The target position to be measured is a circle whose maximum length passing the center point is 1 cm. When a distance between measurement intervals is narrow, the measured positions may be overlapped (Refer to FIG. 3).

2) The Length of Color Transition Part (Tv)

When transmittance is measured in a direction from a clear zone side to a colored zone side, a distance (Ty) from a starting point where the transmittance becomes lower to a starting point where the transmittance does not change because the coloring is completely made, was measured.

3) Measurement of Fade Off Zone (FOD: Fade Off Distance)

A distance (FOD) from a point where the relative transmittance (Rt, %) derived from the below equation becomes 80% to a point where the relative transmittance becomes 30% is defined as a fade off zone (fade off distance), and after that, whether a tinted zone 400 and a clear zone 500 is softly converted without color unevenness was judged.

Here, relative transmittance (Rt, %) refers to a relative ratio value of transmittance in a tinted zone 400 with respect to a transmittance in a clear zone 500. It is calculated by below Equation 1.

$$Rt = \frac{To}{Tc} \times 100 \qquad \text{[Equation 1]}$$

In Equation 1, To is a transmittance in a tinted zone, and Tc is a transmittance in a clear zone.

4) Conformity Evaluation of Tinted Zone

The degree of more natural adjustment of a color density was evaluated by a conformity index of Equation 2 considering a light transmittance of a colored zone and a length of a fade-off zone. It was judged as Pass if the conformity index was 100 or more, or evaluated as Fail if the conformity index is below 100.

$$Qc = FOD * T\max \quad [\text{Equation 2}]$$

In Equation 2, Qc refers to the conformity index, FOD is a distance (mm) of the fade off zone, and T max is a transmittance (%) in the colored zone.

5) Penetration Resistance Evaluation

The aging of films of Examples 1 to 3 proceeded for 72 hours at 20° C. and 20 RH %. A position of the fade-off zone was adjusted in the center of the laminated glass. The film was interposed between two pieces of clear glass (length 10 cm, width 10 cm, and thickness 2.1 mm) for vacuum laminating thereof for 30 seconds in a laminator at 110° C. and 1 atmospheric pressure, thereby pre-pressuring the laminated glass. Subsequently, the pre-pressured laminated glass was pressured for 20 minutes in the condition of a temperature of 140° C. and a pressure of 1.2 MPa, thereby obtaining a laminated glass.

Resin compositions used to manufacture films and the result evaluated above were shown in Tables 2 and 3 below.

Referring to Table 3, in a case of a sample film of Example 1 comprising a first colored layer and a second colored layer applied with a coloring agent in different amounts, it was verified that the length of a fade off zone (FOD) was shown to be comparatively long. Thereby a natural variation of a color density was induced. Also, a value of 144 was obtained as the result of conformity evaluation in a tinted zone, so that it was shown to be above 100, which is an evaluation standard. Also, the sample film was evaluated as having mechanical properties at a level for satisfying penetration resistance.

In the case of Example 2, the conformity value of a tinted zone was 96, so that the length of the fade-off zone was evaluated as being somewhat short compared to its color density. Still, characteristics such as penetration resistance and the like were shown as being satisfied. In Example 3, a colored layer was embodied by using a dispersion liquid for coloring in a relatively large amount against other examples. Accordingly, the length of a fade-off zone (FOD) was relatively long so that a color change zone having a natural color variation was embodied. The conformity of the color change zone was also satisfied. Still, the viscosity of the resin was low due to the use of a dispersion liquid for coloring in a large amount; thus, penetration resistance was not sufficiently satisfied with a structure formed in Example 3.

Hereinabove, the embodiments of example embodiments have been described in detail, but the scope of the present disclosure should not be limited thereto, and various modifications and improvements made by a person of ordinary skill in the art with using a basic concept defined by the following claims should also be construed to belong to the scope of the present disclosure.

What is claimed is:

1. A glass lamination film comprising:

a film comprising a resin layer;

a tinted zone of the resin layer; and a clear zone of the resin layer, wherein the tinted zone comprises a colored zone with a fixed color and a color change zone disposed between the colored zone and the clear zone, and a color of the color change zone has a varying density,

TABLE 2

| Classification | No. | Composition (wt %) | | | |
|---|---|---|---|---|---|
| | | Type | Type (wt %) | Additive (wt %) | PVB Resin (wt %) | Total Amount (wt %) |
| Example 1 | First Colored Layer | A | 28.2 | 0.55 | 71.25 | 100 |
| | Second Colored Layer | B | 35.25 | 0.55 | 64.2 | 100 |
| Example 2 | First Colored Layer | A | 28.2 | 0.55 | 71.25 | 100 |
| Example 3 | First Colored Layer | B | 35.25 | 0.55 | 64.2 | 100 |

TABLE 3

| Classification | Film Properties | | | | | |
|---|---|---|---|---|---|---|
| | Thickness of a Colored Layer (Tz) (μm) | Length of Tinted zone (400) (mm) | Transmittance of Colored Zone (410) * (%) | Length of Fade Off Zone (FOD) (mm) | Conformity of Tinted Zone | Penetration Resistance |
| Example 1 | 150 / 150 | 150 | 8.0% | 18 | pass | pass |
| Example 2 | 300 | 150 | 8.0% | 12 | fail | pass |
| Example 3 | 300 | 150 | 8.0% | 24 | pass | fail |

* Transmittance of Colored Zone is an absolute transmittance value as a visible light transmittance (Tv).

wherein a fade off zone has relative transmittance (Rt, %) of 30 to 80% indicated by Equation 1:

$$Rt = \frac{To}{Tc} \times 100$$

where To is a transmittance in the tinted zone and Tc is the transmittance in the clear zone, wherein the color change zone comprises the fade off zone having a distance of 15 to 25 mm, wherein the tinted zone comprises a first colored layer disposed in the resin layer and a second colored layer disposed below the first colored layer, the first colored layer and the second colored layer each having a transmittance less than Tc, wherein an amount of plasticizer in the second colored layer is larger than an amount of the plasticizer in the first colored layer, and wherein an amount of a coloring agent in the first colored layer and an amount of a coloring agent in the second colored layers are different.

2. The glass lamination film of claim 1, wherein the amount of the coloring agent in the second colored layer is larger than the amount of the coloring agent in the first colored layer.

3. The glass lamination film of claim 1, wherein the tinted zone further comprises a C1-C5 substituted trioxane-based compound.

4. The glass lamination film of claim 1 further comprising:
a function layer disposed between the first colored layer and the second colored layer.

5. A light transmission laminate comprising:
the glass lamination film of claim 1 disposed between a first light transmission layer and a second light transmission layer.

6. A vehicle comprising the light transmission laminate of claim 5.

7. A glass lamination film comprising:
a film comprising a resin layer;
a tinted zone of the resin layer; and
a clear zone of the resin layer,
wherein the tinted zone comprises a colored zone with a fixed color and a color change zone disposed between the colored zone and the clear zone, and a color of the color change zone has a varying density,
wherein a fade off zone has relative transmittance (Rt, %) of 30 to 80% indicated by Equation 1:

$$Rt = \frac{To}{Tc} \times 100$$

where To is a transmittance in the tinted zone and Tc is the transmittance in the clear zone, wherein the color change zone comprises the fade off zone having a distance of 15 to 25 mm, wherein a conformity index value of 100 or more indicated by Equation 2:

$$Qc = FOD * T\max$$

where Qc refers to the conformity index, FOD is a distance (mm) of the fade off zone, and Tmax is the transmittance (%) in the colored zone, wherein the tinted zone comprises a first colored layer disposed in the resin layer and a second colored layer disposed below the first colored layer, the first colored layer and the second colored layer each having a transmittance less than Tc, wherein an amount of plasticizer in the second colored layer is larger than an amount of the plasticizer in the first colored layer, and wherein an amount of a coloring agent in the first colored layer and an amount of a coloring agent in the second colored layers are different.

\* \* \* \* \*